US011174841B2

(12) United States Patent
Stähler (10) Patent No.: US 11,174,841 B2
(45) Date of Patent: Nov. 16, 2021

(54) METHOD FOR INCREASING THE YIELD OF A WIND FARM UNDER ICING CONDITIONS

(71) Applicant: FOS4X GMBH, Munich (DE)

(72) Inventor: Peter Stähler, Planegg (DE)

(73) Assignee: FOS4X GMBH, Munich (DE)

( * ) Notice: Subject to any disclaimer, the term of this patent is extended or adjusted under 35 U.S.C. 154(b) by 94 days.

(21) Appl. No.: 16/641,974

(22) PCT Filed: Aug. 14, 2018

(86) PCT No.: PCT/EP2018/072024
§ 371 (c)(1),
(2) Date: Feb. 25, 2020

(87) PCT Pub. No.: WO2019/038138
PCT Pub. Date: Feb. 28, 2019

(65) Prior Publication Data
US 2020/0217300 A1   Jul. 9, 2020

(30) Foreign Application Priority Data
Aug. 25, 2017 (DE) .................. 10 2017 119 540.8

(51) Int. Cl.
*F03D 17/00* (2016.01)
*F03D 7/04* (2006.01)
(Continued)

(52) U.S. Cl.
CPC .......... *F03D 7/048* (2013.01); *F03D 7/0264* (2013.01); *F03D 17/00* (2016.05); *F03D 80/40* (2016.05)

(58) Field of Classification Search
CPC .......... F03D 7/048; F03D 17/00; F03D 80/40; F03D 7/0264
See application file for complete search history.

(56) References Cited

U.S. PATENT DOCUMENTS

2009/0110539 A1   4/2009   Uphues
2010/0143120 A1*  6/2010   Kumar .................... F03D 7/026
                                                          416/1
(Continued)

FOREIGN PATENT DOCUMENTS

EP   1906192 B1   9/2015

OTHER PUBLICATIONS

German Patent Office Examination Report for application No. 102017119540.8, dated Jun. 25, 2018.
(Continued)

*Primary Examiner* — Michael Lebentritt
(74) *Attorney, Agent, or Firm* — Moser Taboada (57) ABSTRACT

The invention relates to a method for monitoring a wind farm. The method includes determining a first ice mass on a first wind turbine of the wind farm; determining at least one second ice mass on at least one second wind turbine of the wind farm; comparing a first ice mass with a second ice mass and determining a primary wind turbine, which serves as a reference, and at least one secondary wind turbine from the group of the first wind turbine and the at least one second wind turbine; switching off the at least one secondary wind turbine on the basis of a first ice mass from the primary wind turbine; and switching on the at least one secondary wind turbine on the basis of a second ice mass from the primary wind turbine.

10 Claims, 5 Drawing Sheets

(51) Int. Cl.
    *F03D 80/40*      (2016.01)
    *F03D 7/02*       (2006.01)

(56) References Cited

U.S. PATENT DOCUMENTS

| | | |
|---|---|---|
| 2014/0246857 A1 | 9/2014 | Giertz et al. |
| 2019/0063406 A1* | 2/2019 | Nielsen .................. F03D 17/00 |
| 2020/0028367 A1* | 1/2020 | Brombach .............. H02J 3/386 |
| 2020/0386206 A1* | 12/2020 | Schauss ................. F03D 7/046 |

OTHER PUBLICATIONS

International Search Report for application No. PCT/EP2018/072024, dated Nov. 26, 2018.

* cited by examiner

METHOD FOR INCREASING THE YIELD OF A WIND FARM UNDER ICING CONDITIONS

TECHNICAL FIELD

Embodiments of the present disclosure relate to a method for monitoring a wind farm, and to a device for monitoring a wind farm by means of a method.

STATE OF THE ART

Rotor blades of wind turbines are exposed to the environmental weather conditions in an unprotected manner. At certain locations, ice may accumulate at the rotor blades in case of correspondingly low environmental temperatures and sufficiently high air humidity or occurring rainfall. With the increasing size of the rotor blades of wind turbines, their specific surface increases as well so that also the risk of ice accumulating, i.e. the formation of an ice accretion on the rotor blades, is increased.

Ice agglomerations, on the one hand, represent a potential danger for the environment of the wind turbine, since when the ice accretion is ejected—during operation or at standstill of the turbine—ejected ice pieces may endanger persons or objects within the ejection radius. On the other hand, in particular in case of uneven ice agglomeration, also an imbalance of the rotor of the wind turbine may occur which can lead to damages during the operation of the wind turbine. Furthermore, permanent ice agglomeration can lead to a stop of the entire turbine. This normally entails yield losses and economic disadvantages.

It is known to evaluate data of a wind turbine to draw conclusions as to the danger of an already occurred agglomeration of ice. DE 10 2005 016 524 A1 discloses a method for detecting ice on a wind turbine, in which both the meteorological conditions relating to icing conditions are monitored, and one or more physical characteristics of the wind turbine in operation are monitored, which allow a mass change of the rotor blades of the wind turbine to be deduced. US 2012/0226485 A1 describes a method for predicting the probability of ice formation or accumulation on rotor blades of wind turbines. The method utilizes inter alia the historical measurement of meteorological data such as wind speed, temperature and relative air humidity.

In wind farms, there are repeatedly icing events on e.g. rotor blades of the individual wind turbines in winter. Often, wind turbines in wind farms must be stopped subsequently. This results in yield losses of the wind farm operators due to a reduced availability of the turbines.

SUMMARY OF THE INVENTION

Embodiments of the present disclosure provide a method for monitoring a wind farm. Furthermore, embodiments of the present disclosure provide a device for monitoring according to the described method.

According to an embodiment, a method for monitoring a wind farm is proposed, including determining a first ice mass on a first wind turbine of the wind farm; determining at least one second ice mass on at least one second wind turbine of the wind farm; comparing a first ice mass with a second ice mass and determining a primary wind turbine, which serves as a reference, and at least one secondary wind turbine from the group of the first wind turbine and the at least one second turbine; switching off the at least one secondary wind turbine on the basis of a first ice mass of the primary wind turbine; and switching on the at least one secondary wind turbine on the basis of a second ice mass of the primary wind turbine.

According to a further embodiment, a device of a wind farm including a controller is described for controlling wind turbines of the wind farm.

BRIEF DESCRIPTION OF THE DRAWINGS

Exemplary embodiments are illustrated in the drawings and explained in more detail in the description hereinafter. Shown are in the drawings.

In the drawings, identical reference numerals denote identical or functionally identical components or steps.

WAYS FOR CARRYING OUT THE INVENTION

Hereinafter, detailed reference is made to various embodiments of the invention, with one or more examples being depicted in the drawings.

The present invention is applicable for increasing the availability of individual wind turbines of a wind farm and for minimizing yield losses for the entire wind farm in the icing event.

Figure 1:
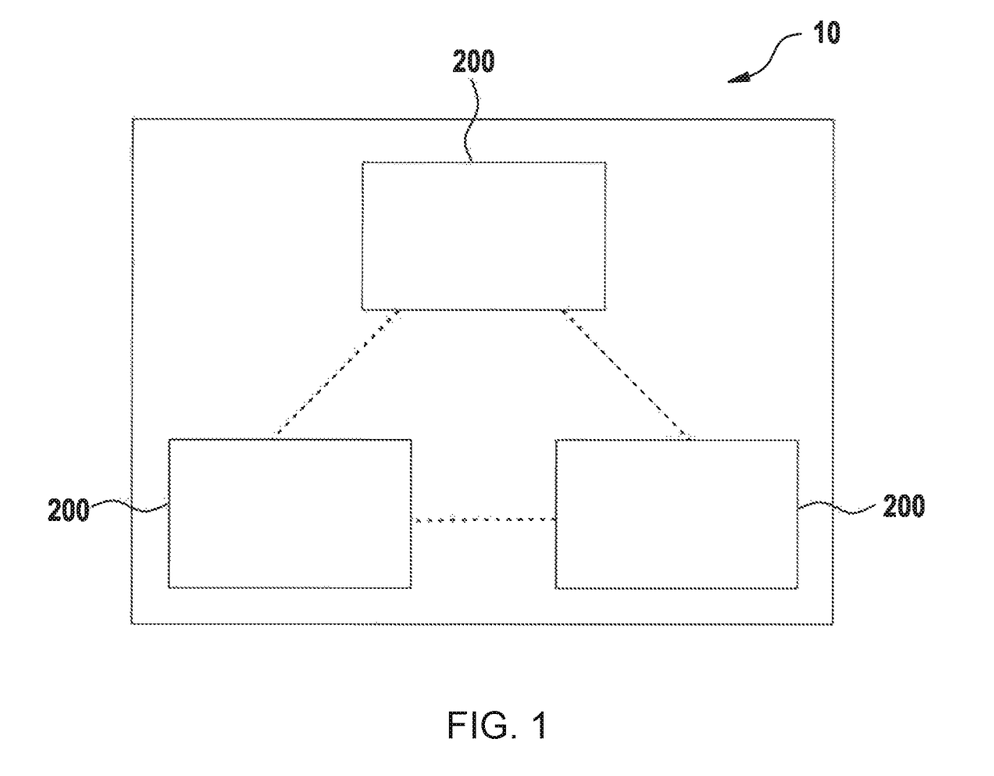
FIG. 1 schematically shows a wind farm with three wind turbines, by way of example, according to embodiments described herein.

FIG. 1 shows a wind farm 10, by way of example including of three wind turbines 200. The wind turbines 200 are mutually interlinked as shown in FIG. 1 by dashed lines. The interlinking enables communication, for example a real-time communication, between the individual wind turbines. The interlinking further enables common monitoring, control and/or regulation of the wind turbines. In addition, the wind turbines can also be monitored, controlled and/or regulated individually. According to embodiments described herein, a wind farm can include two or more wind turbines, in particular five or more wind turbines, such as, for example, ten or more wind turbines.

The wind turbines 200, for example, the wind turbines of FIG. 1, form the wind farm 10 in their entirety. The wind farm includes at least two wind turbines. The spatial proximity of the wind turbines further enables similar environmental impacts upon the wind turbines of the wind farm to be validated. This allows the assumption to be made that similar environmental influences act upon turbines of the wind farm to a similar extent.

According to an embodiment, the wind farm 10 may include of a first wind turbine and at least one second wind turbine. From the group of the first wind turbine and the at least one second wind turbine, a primary wind turbine may be determined. Turbines of this group that are not determined to be the primary turbine, are secondary wind turbines.

Figure 2A:
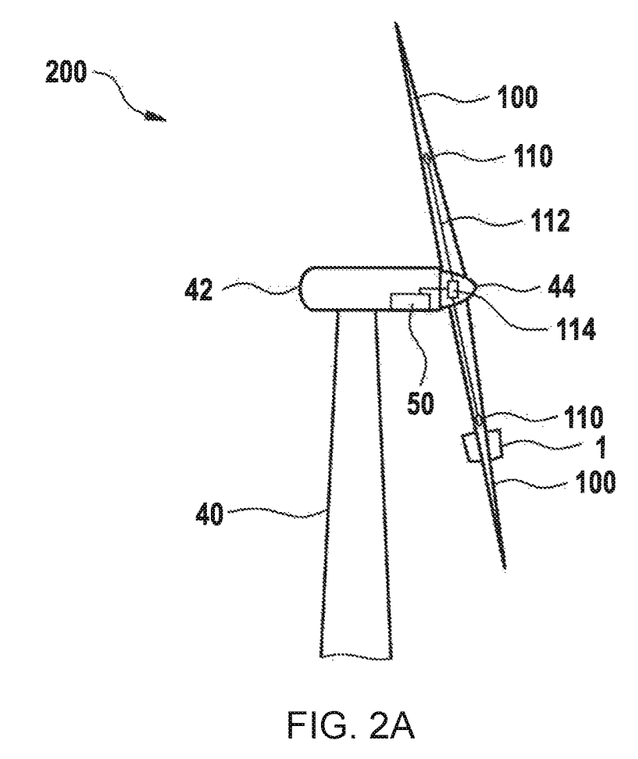
FIG. 2A schematically shows a part of a wind turbine with rotor blades and sensors according to embodiments described herein.

FIG. 2A shows a wind turbine 200 of a wind farm by way of example, to which the method described herein may be applied. The wind turbine 200 includes a tower 40 and a nacelle 42. To the nacelle 42, the rotor is attached. The rotor includes a hub 44, to which the rotor blades 100 are attached. According to typical embodiments, the rotor has at least 2 rotor blades, in particular 3 rotor blades. During operation of the wind turbine, the rotor, i.e. the hub together with the rotor blades, rotates about an axis. During this, a generator is driven to generate electric power. As illustrated in FIG. 2A, at least one sensor 110 is provided in a rotor blade 100. The sensor is in connection with an evaluation unit 114 by means of a signal line. The evaluation unit 114 delivers a signal to a control unit and/or regulation unit 50 of the wind turbine 200.

In the area of the rotor blade tip of the rotor blades 100, an ice accretion 1 is schematically illustrated. By means of the sensor 110, vibrations or accelerations are, for example, detected in the rotor blade, which sensor may be designed according to described embodiments as a vibration sensor or an acceleration sensor. The sensor 110 may be, for example, in the form of electrical and/or fiber optical sensors. The sensors may be configured to measure a first ice mass and at least one second ice mass.

Figure 2B:
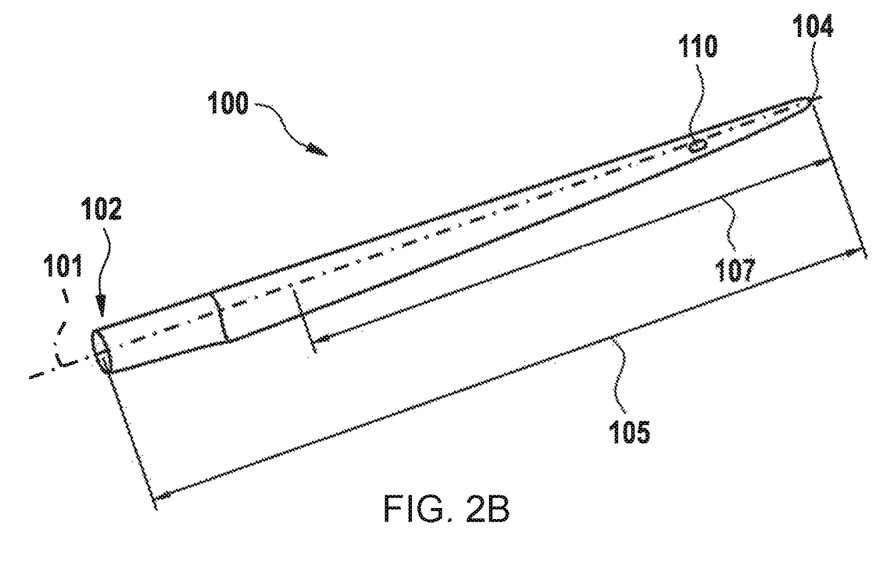
FIG. 2B schematically shows a rotor blade of a wind turbine with a sensor according to embodiments described herein.

FIG. 2B shows a rotor blade 100 of a wind turbine. The rotor blade 100 has an axis 101 along its longitudinal extension. The length 105 of the rotor blade extends from the blade flange 102 to the blade tip 104. According to embodiments described herein, a sensor 110 is situated in an axial or radial area, that is an area along the axis 101.

It is often desirable to enable direct monitoring of the wind farm so that an icing of the rotor blades of one or more wind turbines may be responded to without any delay. Furthermore, autonomously monitoring and regulating is advantageous.

According to an embodiment, turbines may be a primary wind turbine or a secondary wind turbine. A primary wind turbine is a reference turbine. In the icing event, ice may agglomerate inter alia at the rotor blades 100. At turbines, the agglomeration of ice or the ice accretion can be measured. The amount or the volume of agglomerated ice may vary between the individual turbines within the limits set by the spatial proximity.

An agglomeration of ice or an ice accretion, such as used herein, denotes an increase of an ice mass on a rotor blade in the course of time. Furthermore, a decrease of ice may be given. An increase of an ice mass may be an agglomeration or increase of an ice mass, thus may be positive, or may be a decrease of an ice mass, thus may be negative. An icing event, such as used herein, denotes the occurrence of an agglomeration of ice on at least one wind turbine of a wind farm.

In the icing event, the ice mass accumulating in a period of time on the rotor blades of wind turbines may be determined. Determination of an ice mass requires a suitable measured variable to be measured. The measurement is performed by means of sensors 110. The measured variable may be converted into a system variable S by transformation. The system variable S is determined directly. For example, a natural oscillation of a rotor blade may be measured.

The system variable S is further associated with the mass of the rotor blade. Alternatively or additionally, the system variable S is associated with the mass of an ice accretion on the rotor blade. Typically, the system variable S is obtained from measurement data of vibration or acceleration measurements in or on a rotor blade or several rotor blades. In embodiments, the measured variable is measured in the course of time of a detection period, preferably by measuring vibrations or accelerations in the course of time of the detection period T. The measurement is performed on or in the rotor blade.

The system variable S is deduced from the measurement data, preferably by natural frequency analysis from the measurement data of the vibration and acceleration measurements. The system variable S allows conclusions to be drawn as to the mass of the respective rotor blade or the respective rotor blades and/or to the ice accretion mass of the respective rotor blade or the respective rotor blades. The documentation of the measurement data and the transformation thereof can be noted in an ice mass diagram or in an ice mass curve. In embodiments, the system variable S is proportional to the total mass of the rotor blade and/or proportional to an additional mass coating of the rotor blade. An additional mass coating of the rotor blade is such a mass coating added to the net weight of the rotor blade. Typically, the system variable is proportional to the ice mass.

The measurement of the ice accretion on a rotor blade is performed in the detection period T by sensors 110. The measurement data may be detected continuously or in appropriate sampling intervals on the wind turbine during a period of several days and/or hours, wherein the detection period T can correspond to such a period.

From a diagram as described above, several items of information on the system variable S can be read out. Thus, the ice mass can be detected at a certain point of time of the detection period T, for instance. Alternatively, an increase of the ice mass may be determined in a diagram between two points of time $t_1$ and $t_2$ of the detection period T.

An increase of an ice mass as used herein may adopt positive and negative values. An increase of an ice mass indicates the change of the amount of the ice accretion at a certain point of time $t_x$ or in a certain detection period T. Obtained values may enable the comparison of data of various wind turbines in a wind farm.

According to embodiments described herein, which can be combined with other embodiments, the progression of the ice mass curves may be monitored in turbines in the farm. A turbine may experience a relevant ice mass increase (control of the increase of the ice mass curves). For example, the turbine having the biggest increase may be defined as a primary wind turbine. Additionally or alternatively, the turbine having the biggest ice mass may be defined as a primary wind turbine. The primary wind turbine may serve for reference. In case of an occurring icing, the turbine may be monitored as to the parameter "increase of the ice mass on running systems". Alternatively or additionally, the turbine may be monitored, when icing occurs, as to the parameter "maximum/peak of the icing". Remaining turbines in the wind farm, e.g. the secondary wind turbines, may be switched off as a prevention when a threshold value is exceeded. The switched off turbines may remain in this state until the release. After reaching a plateau of the ice mass curve of e.g. the primary turbine, the remaining turbines may be activated again for normal operation. Due to the early stop, the switched off turbines typically have developed less ice accretion. Most of the turbines of the wind farm may be available again for energy generation much earlier than the primary turbine, on which an ice mass plateau is determined.

Figure 3:
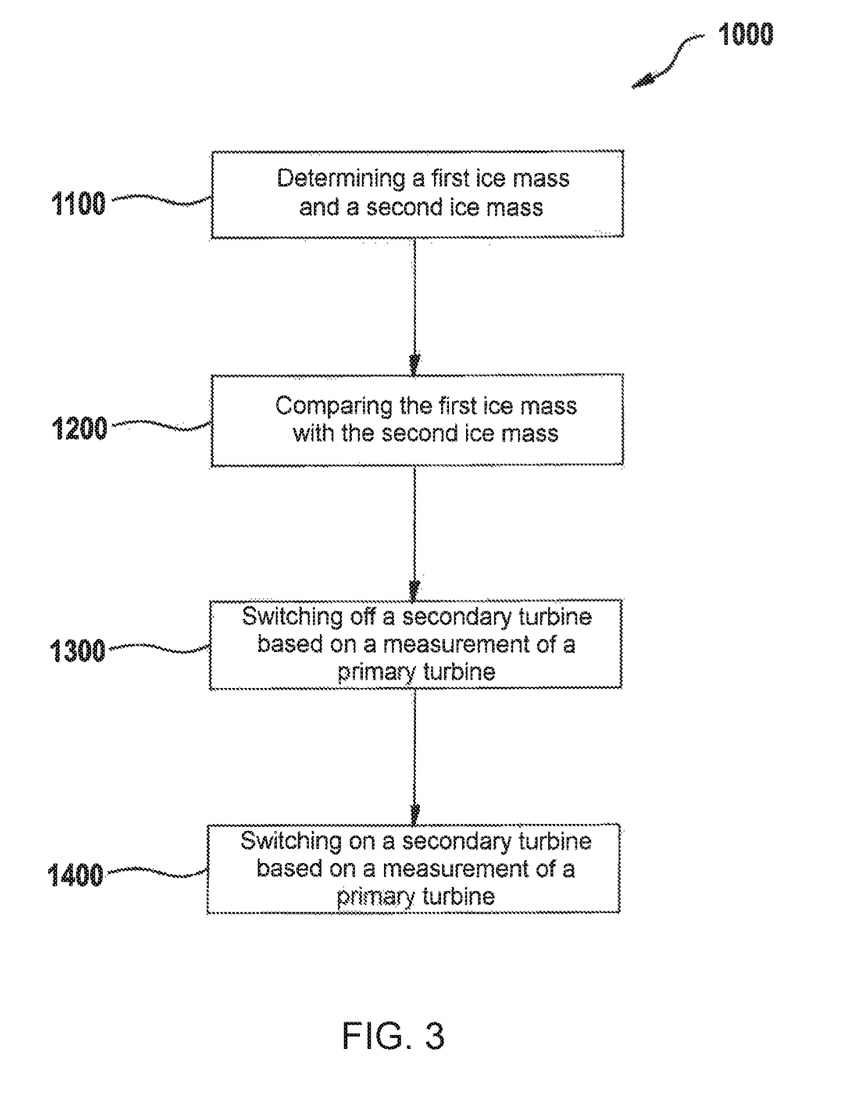
FIG. 3 shows a flow chart of a method according to embodiments described herein.

FIG. 3 shows a flow chart of a method 1000 according to embodiments described herein for monitoring the wind farm 10.

In a step 1100 of the method, a first ice mass is determined on a first wind turbine of the wind farm. Additionally, at least one second ice mass on at least one second wind turbine of the wind farm is determined. The ice masses of the group of wind turbines of a wind farm may be determined. Alternatively, the increases of ice masses of the group of wind turbines may be determined. According to embodiments described herein, actual ice masses may be detected. Ice masses may be determined from measurement data measured on or in the rotor blade. This may be performed e.g. by means of an ice mass curve or an ice mass diagram. The items of information of the group of wind turbines describe, as described above, a behavior of the ice mass over a period of time in which measurement data are acquired.

In a step 1200 of the method, a first ice mass of the first wind turbine is compared with a second ice mass of the at least one second wind turbine. Ice masses of wind turbines of a wind farm may be compared. Alternatively, increases of an ice mass of wind turbines of a wind farm may be compared. The wind turbine exhibiting the biggest ice mass, for example, at a comparison time $t_V$, is determined to be the primary wind turbine. Alternatively, the wind turbine having the biggest increase of the ice masses, e.g. recorded at a comparison time $t_V$, is determined to be the primary wind turbine. Turbines which are not determined to be the primary turbine will become secondary wind turbines.

The comparison time $t_V$ as used herein may be e.g. a point of time briefly after the first occurrence of an icing event on a wind turbine of a wind farm. The comparison time $t_v$ may be fixed appropriately for a wind farm.

In a step 1300 of the method, the at least one secondary wind turbine is switched off based on a first ice mass of the primary wind turbine. For example, the ice mass of the primary wind turbine may reach a first threshold value, e.g. a threshold value $S_A$. The primary turbine experiences a first ice alarm. By way of example, the ice mass of the primary turbine does not reach an upper threshold value $S_O$, which would result in the primary turbine being switched off. The primary wind turbine remains in operation and continues to serve as a reference. Secondary wind turbines may be switched off based on the primary wind turbine, for example, when the primary turbine reaches the threshold value $S_A$. Wind turbines which are not determined to be a reference turbine, additionally or alternatively may be switched off individually. An ice alarm, that is to say, a first ice alarm for switching off secondary turbines may be generated when a first switch-off threshold in the gradient of the ice accretion, e.g. in the ice accretion of the primary turbine, is exceeded. The first ice alarm may also be generated by a first ice mass threshold being exceeded in particular on the primary turbine. A second ice alarm at the primary turbine may be a "normal" ice alarm, upon which also the turbine of the normal ice alarm itself will stop.

A condition for switching off the wind turbines due to an amount of accumulated ice impairing the operation may be fixed by threshold values. Ice masses of turbines of a wind farm may reach an upper threshold value $S_O$. An ice mass of a primary wind turbine moreover may reach a threshold value $S_A$.

An upper threshold value $S_O$ is, for example, a defined upper threshold value for the amount of accumulated ice, e.g. the mass and/or the volume of accumulated ice beyond which a safe operation of the wind turbine is no longer permitted or no longer possible. An upper threshold value $S_O$ may be determined empirically, for instance, or may be dictated by provisions with respect to the operational safety of the wind turbine. Upon the threshold value $S_O$, an ice alarm is triggered. Measurements on or in the rotor blade may also be performed in turbines which are not in operation. Moreover, threshold values for the increase of ice masses may also be used additionally or alternatively.

According to embodiments described herein, reference is made to threshold values. In general, signals for switching off or switching on may be determined from the measurement data on the wind turbines, in particular the primary wind turbine. Threshold values may be fixed for various parameters. For example, threshold values for meteorological data, such as e.g. temperature, combined with air humidity may be available. Also, threshold values for the ice recognition may result from power curves of a wind turbine. However, threshold values for rotor blade loads may also exist, for example, which e.g. are measured on a blade root by means of strain sensors, for example.

A further condition for switching off the wind turbines due to an amount of accumulated ice impairing the operation may further be fixed by a threshold value $S_A$ which is suitable for the system variable S. The threshold value $S_A$, for example, is a defined threshold value for an amount of accumulated ice, e.g. the mass and/or the volume of accumulated ice, beyond which high yield losses of the wind farm must be expected due to the affected wind turbines being switched off. The threshold value $S_A$ is less than the threshold value $S_O$. The threshold value $S_A$, for example, may be determined empirically.

When the upper threshold value $S_O$ is reached, the turbines may experience a second ice alarm. When the threshold value $S_A$ is reached, the primary turbine may experience a first ice alarm. When the first threshold value $S_A$ is reached, the primary turbine may cause a signal for the at least one secondary wind turbine to be switched off.

An ice alarm as used herein can arise when a threshold value of a primary or a secondary wind turbine of a wind farm is exceeded. An ice alarm may be triggered when one of the threshold values $S_A$ or $S_O$ is or both are exceeded in a turbine. A first ice alarm may be triggered when the threshold value $S_A$ is exceeded. A second ice alarm, triggered by the threshold value $S_O$ being exceeded, leads to the turbine being switched off where the first ice alarm was triggered. A first ice alarm, triggered by the threshold value $S_A$ being exceeded, triggers a signal for switching off another turbine where no ice alarm is triggered at the same time. Measurements of the ice mass, the ice accretion or the ice accumulation may be performed when the turbine is switched off.

The switching off or stopping of a turbine as used herein, primarily is to be understood as the stopping of the rotor blades. The measurements on or in the rotor blades may continue even if the rotor blades are at standstill.

In a step 1400 of the method, the at least one secondary wind turbine is switched on based on a second ice mass or an increase of the ice mass (e.g. plateau of the ice mass, i.e. increase=0) of the primary wind turbine. A second ice mass of a primary wind turbine may reach a plateau phase. In a plateau phase or with a plateau, the ice mass on the rotor blade does not increase. The ice mass on the rotor blade is constant. Alternatively, the second ice mass on the primary turbine may decrease, or the increase of the ice mass on the primary turbine may be negative. If a plateau of the ice mass is reached or the increase of the ice mass is negative, wind turbines may be switched on. For example, the secondary wind turbines may be switched on.

Wind turbines, which are not determined to be the reference turbine, may be switched on. Wind turbines, which are not determined to be the reference turbine, alternatively may be switched on individually. The group of the switched-on wind turbines may be operated in normal mode. A turbine as used herein is in normal mode or normal operation when the parameter for operating the turbine correspond to the otherwise usual parameters. Wind turbines, which are not determined to be the reference turbine, may be operated in normal mode. The primary wind turbine may be switched off. A regeneration of the primary turbine may be performed until the primary turbine is activated again. The regeneration of the primary turbine may be assisted e.g. by actively removing an ice accretion, which in turn may be performed e.g. by a blade heating or mechanically "shaking off" the ice. This assistance allows the regeneration to be accelerated.

It may be derived form historical farm data that an icing event on a wind turbine will persist longer, the longer the turbine was in operation at the beginning of the icing event. The earlier the turbined can be switched off in case of icing, the lower the total loss, since early switching on again may be guaranteed.

Early switching on after icing of a wind farm may significantly increase the total energy yield of the wind farm under icing conditions. The downtimes of turbines until the reference turbine being switched off arise as a negative yield. The additional yield results from the early starting-up of turbines with the exception of the reference turbine.

An already formed ice mass, in combination with the wind and temperature conditions of the turbine may act in operation as a nucleus for the formation of a further ice accretion. It is true, that stationary turbines are also affected by icing events, but the icing event ends earlier due to the smaller ice accretion. Since the secondary wind turbines have developed less ice accretion due to the early stop, the majority of the secondary wind turbines is available again for energy generation significantly earlier than the reference turbine.

Figure 4:
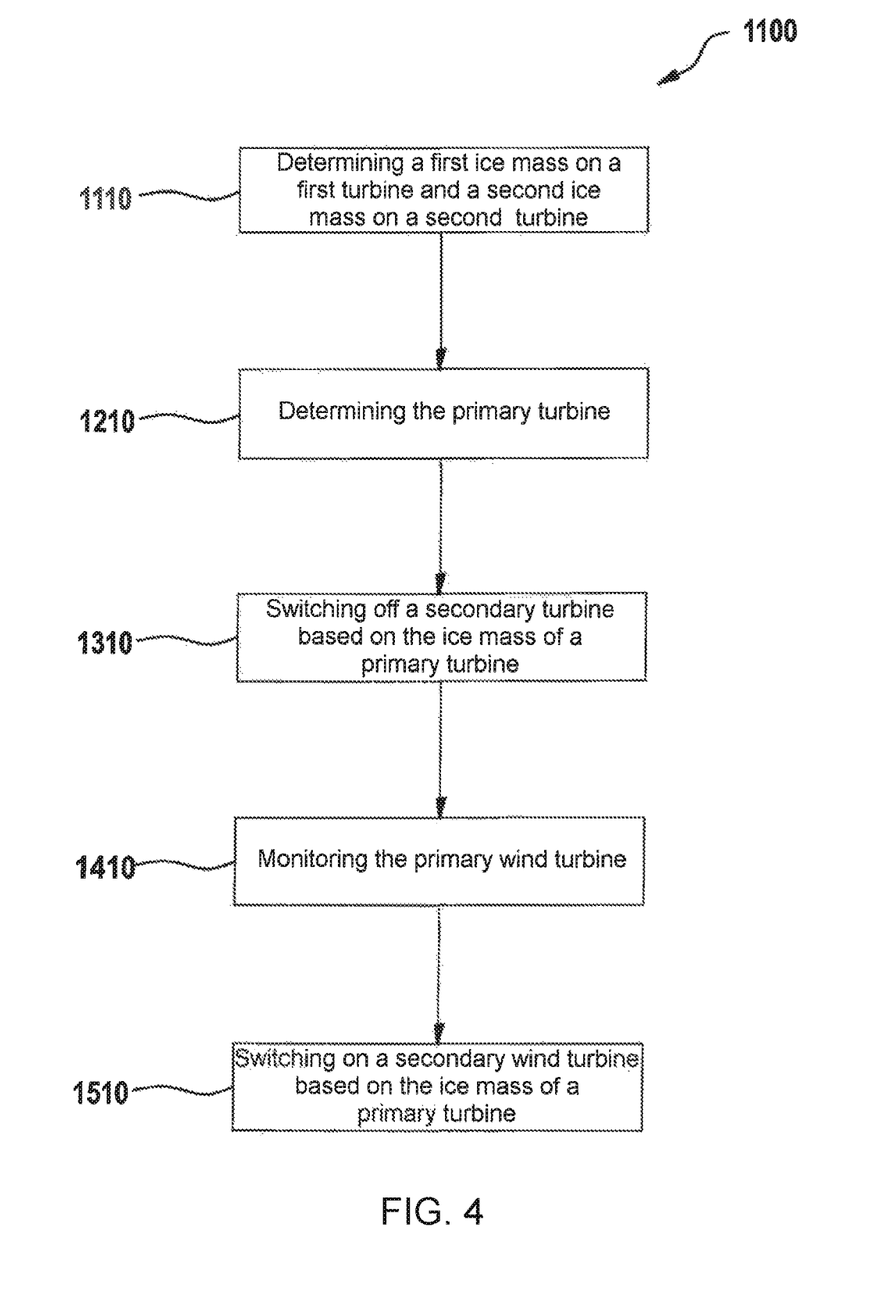
FIG. 4 shows a flow chart of a method according to embodiments described herein.

FIG. 4 shows a flow chart of a method 1100 according to embodiments described herein.

In a step 1110 of the method, a first ice mass on a first wind turbine of the wind farm is determined. Additionally, at least one second ice mass on at least one second wind turbine of the wind farm is determined. When icing begins in the wind farm, the ice mass curves of the turbines in the farm rise until one of the threshold values $S_O$ or $S_A$ is or both are reached. By means of the measurements carried out by the sensor on or in the rotor blade, ice masses may be determined, for example, as ice mass curves or ice mass diagrams. Alternatively or additionally, further sensors and/or data may be used for the determination of the ice mass.

From the measurements, the ice masses and/or an increase of the ice masses may be compared between various turbines at various comparison times $t_V$ and $t_V'$. The data may be further compared over a whole detection period T.

In a step 1210 of the method, a primary turbine is determined. The wind turbines, which do not become the primary turbine, become secondary wind turbines. The turbine having the steepest increase in the ice mass curve remains in normal mode and serves as a reference. When the threshold value $S_A$ is reached, a first ice alarm is triggered at the primary turbine. When the first ice alarm is reached, for example, based on a threshold value, e.g. the threshold value $S_A$, the primary turbine may cause a signal for the at least one secondary wind turbine to be switched off.

When a threshold value $S_O$ is exceeded, a second ice alarm may be triggered at the primary wind turbine. The primary wind turbine may be switched off. The measurement of the ice mass may continue to be performed at the primary wind turbine at wind speeds of more than 2 to 3 m/s. The measurement of the ice mass may be performed over the entire duration of icing. The measurement may be carried out in intervals, e.g. in intervals during which wind speeds of at least 2 to 3 m/s are prevailing.

In a step 1310 of the method, the at least one secondary wind turbine is switched off based on a first ice mass of the primary wind turbine. The turbines from the group of the first wind turbine and at least one second turbine are switched off. The secondary wind turbines may be switched off. Switching off may be performed, for example, when the ice mass of the primary turbine has reached the threshold value $S_A$ or when the primary turbine determines a first ice alarm.

Switching off may be performed when a first ice mass is determined on the primary wind turbine. A first ice mass may be determined at a time $t_V$. At the time $t_V$, the threshold value $S_A$ of a first ice mass on the primary wind turbine may have been reached. Typically, a first ice mass at the time $t_V$ and an increase of the first ice mass at the threshold value $S_A$ are positive. The primary wind turbine remains in normal mode. Typically, less ice mass accumulates on switched-off turbines.

In a step 1410 of the method, the primary wind turbine is monitored. In addition, also the at least one secondary wind turbine may be monitored. An ice mass may be monitored. An increase of the ice mass may be monitored. The maximum or peak of icing may be derived. The ice mass or the increase of an ice mass may be monitored at the primary wind turbine. The ice mass or the increase of an ice mass may be monitored at different points in time and/or over a certain period of time. The ice mass or the increase of an ice mass may exhibit a plateau. Alternatively, the ice accretion may be negative. If the increase of an ice mass of the primary wind turbine remains constant over a certain period of time, the icing event on the primary wind turbine may be considered to be terminated.

In a step 1510 of the method, the at least one secondary wind turbine is switched on based on an ice mass of the primary wind turbine. Switching on the at least one secondary wind turbine may be performed, for example, as soon as the second ice mass of the primary wind turbine or an increase in a second ice mass of the primary wind turbine reaches a plateau or becomes negative. If there is no further ice accretion, secondary turbines of the wind farm may again be activated for normal operation. An automatic change of the stopped turbines may be performed in a normal mode of operation. The reference turbine is regenerated. The time until the stop of the reference turbine typically is only a few hours.

Typically, the early switching on of the stopped turbines is done half a day to several days before switching on the reference turbine after regeneration.

The described method may be restarted immediately if further icing processes occur in the wind farm. The wind turbine that had been determined to be the reference turbine or primary wind turbine in a preceding icing event may be involved in a new method. For example, this may take place after a regeneration has been completed. Alternatively, the method may proceed based on the previous secondary turbines, in particular if the previous primary turbine still exhibits a residue of ice accretion. Further, the method may be interlaced. This is necessary when during the fading away of a first icing in the wind farm, new icing occurs. The described method is then applied again to turbines which had not been determined to be the reference turbine in the preceding method. Steps of the method may take place in a fully automated manner.

A further aspect in monitoring wind turbines, which can be combined with other embodiments and aspects described herein, but which can also be provided independently of further embodiments, aspects and details, is a device for monitoring a wind farm by means of the described embodiments of the method, wherein the device features a controller. A controller may serve in interlinking a first wind turbine of the wind farm with at least one second wind turbine of the wind farm for all wind turbines. The controller may serve to simultaneously and/or individually control the wind turbines. The controller may further allow the turbines in a wind farm to be full automatically controlled and regulated. The controller may be connected to an evaluation unit of a wind turbine. The controller may execute, for example, the steps of one of the methods described herein by means of software and/or hardware.

Figure 5:
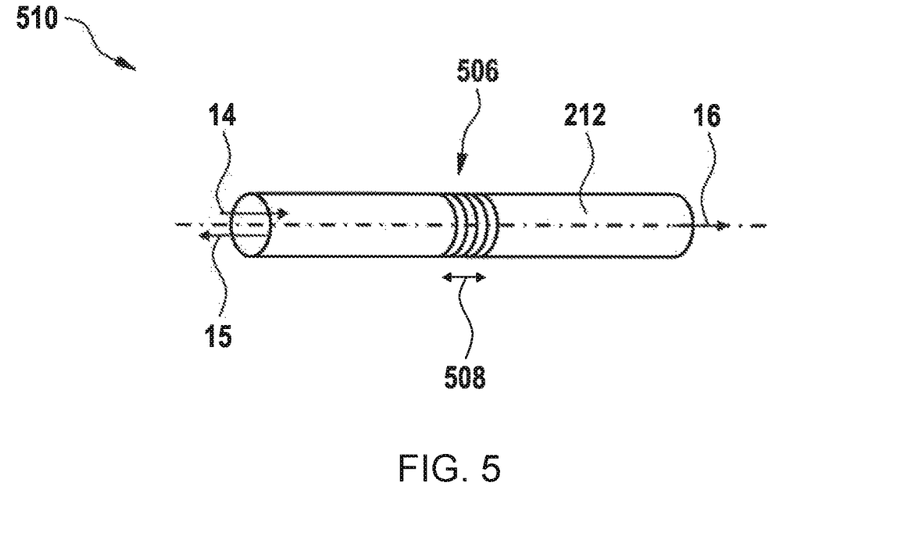
FIG. 5 schematically shows a light guide with a fiber Bragg grating for use in sensors according to embodiments described herein.

FIG. 5 schematically shows a light guide with a fiber Bragg grating for use in sensors according to embodiments described herein.

FIG. 5 shows a sensor or fiber optic sensor 510 integrated in a light guide, which features a fiber Bragg grating 506. Although only a single fiber Bragg grating 506 is shown in FIG. 5, it should be understood that the present invention is not restricted to a data acquisition from a single fiber Bragg grating 506; instead, a plurality of fiber Bragg gratings 506 may be arranged along a light guide 212, a transmission fiber, a sensor fiber or an optical fiber.

FIG. 5 thus only shows a portion of a light guide formed as a sensor fiber, optical fiber or light guide 212, wherein this sensor fiber is sensitive to fiber elongation (see arrow 508). It should be noted here that the expression "optical" or "light is intended to indicate a wavelength range in the electromagnetic spectrum which may extend from the ultraviolet spectral range over the visible spectral range up to the infrared spectral range. An average wavelength of the fiber Bragg grating 506, i.e. a so-called Bragg wavelength $\lambda B$, is obtained by the following equation:

$$\lambda B = 2 \cdot nk \cdot \Lambda.$$

In this case, nk is the effective refractive index of the basic mode of the core of the optical fiber, and $\Lambda$ is the spatial grating period (modulation period) of the fiber Bragg grating 506.

A spectral width which is given by the peak width at half height of the reflection response depends on the extension of the fiber Bragg grating 506 along the sensor fiber. Light propagation within the sensor fiber or the light guide 212, due to the effect of the fiber Bragg grating 506, is, for example, dependent on forces, moments and mechanical tensions and temperatures, which are applied to the sensor fiber, i.e. the optical fiber and in particular the fiber Bragg grating 506 within the sensor fiber.

As shown in FIG. 5, electromagnetic radiation 14 or primary light enters into the optical fiber or the light guide 212 from the left, with only a part of the electromagnetic radiation 14 exiting as transmitted light 16 having a wavelength course changed as compared to the electromagnetic radiation 14. Furthermore, it is possible to receive reflected light 15 at the inlet end of the fiber (i.e. at the end where the electromagnetic radiation 14 is irradiated), with the reflected light 15 likewise featuring a modified wavelength distribution. According to the embodiments described herein, the optical signal used for detection and evaluation may be made available by the reflected light, the transmitted light and a combination of both of them.

In a case where the electromagnetic radiation 14 or the primary light is irradiated in a wide spectral range, there will be a transmission minimum in the transmitted light 16 at the place of the Bragg wavelength. At this place, there will be a reflection maximum in the reflected light. A detection and evaluation of the intensities of the transmission maximum or the reflection maximum, or of intensities in corresponding wavelength ranges, will generate a signal which can be evaluated with respect to the length change of the optical fiber or the light guide 212 and thus is indicative of forces or vibrations.

Figure 6:
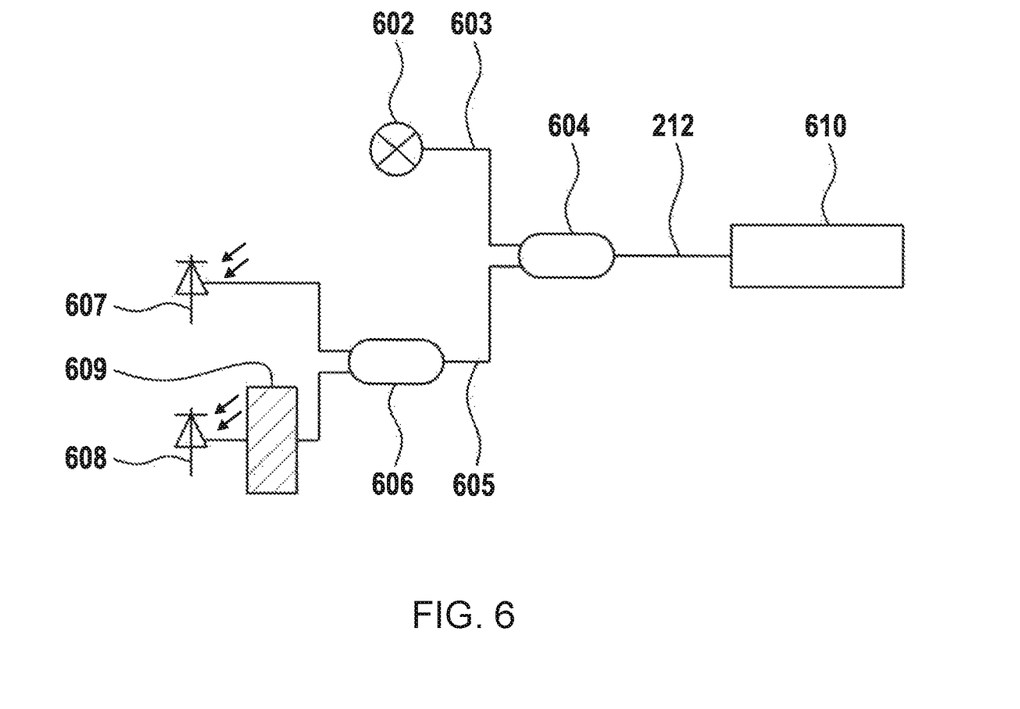
FIG. 6 schematically shows a measurement structure for a fiber optic sensor according to embodiments described herein or for methods for monitoring according to embodiments described herein.

FIG. 6 shows a typical measurement system for evaluating fiber-optic sensors, inter alia acceleration sensors. The system features a source 602 for electromagnetic radiation, for example a primary light source. The source serves to provide optical radiation by means of which at least one fiber-optic sensor element of a sensor, e.g. an acceleration sensor, may be irradiated. For this purpose, an optical transmission fiber or a light guide 603 is provided between the primary light source 602 and a first fiber coupler 604. The fiber coupler couples the primary light into the optical fiber or the light guide 212. The source 602 may be, for example, a broadband light source, a laser, an LED (light emitting diode), an SLD (super luminescence diode), an ASE light source (amplified spontaneous emission light source), or an SOA (semiconductor optical amplifier). For embodiments described herein, several source of the same or a different type (see above) may also be used.

The fiber-optic sensor element 610 such as, for example, a fiber Bragg grating (FBG), or an optical resonator, is integrated into the sensor fiber or optically coupled to the sensor fiber. The light reflected by the fiber-optic sensor elements in turn is guided via the fiber coupler 604 which guides the light via the transmission fiber 605 to a beam splitter 606. The beam splitter 606 splits the reflected light for detection by means of a first detector 607 and a second detector 608. In this case, the signal detected on the second detector 608 is first filtered by means of an optical edge filter 609.

By means of the edge filter 609, a shift of the Bragg wavelength at the FBG or a wavelength change may be detected by the optical resonator. In general, a measurement system as illustrated in FIG. 6 may be provided without the beam splitter 606 or the detector 607. The detector 607, however, enables the measurement signal of the acceleration sensor to be standardized with respect to other intensity fluctuations such as, for example, fluctuations of the intensity of the source 602, fluctuations by reflections at interfaces between individual light guides, or other intensity fluctuations. This standardization improves the measurement accuracy and reduces the dependency of measurement systems on the length of the light guides provided between the evaluation unit and the fiber-optic sensor.

In particular, when several FBGs are used, additional optical filtering means (not illustrated) may be used for filtering the optical signal or secondary light. An optical filtering means 609 or additional optical filtering means may include an optical filter selected from the group consisting of a thin film filter, a fiber Bragg grating, an LPG, an arrayed waveguide grating (AWG), an Echelle grating, a grating array, a prism, an interferometer and any combination thereof.

While the present invention has been described above using typical exemplary embodiments, it is not restricted to these but can be modified in a variety of ways. The invention is neither restricted to the mentioned possibilities of application. It should further be noted at this point that the aspects and embodiments described herein can be appropriately combined with one another, and that single aspects may be omitted where it is reasonable and possible within the scope of skilled action. The skilled person is familiar with modifications and additions of the aspects described herein.

The invention claimed is:

1. A method for monitoring a wind farm, comprising:
   determining a first ice mass on a first wind turbine of the wind farm;
   determining at least one second ice mass on at least one second wind turbine of the wind farm;
   comparing a first increase of the first ice mass with a second increase of the second ice mass for determining a primary wind turbine, which serves as a reference, and at least one secondary wind turbine from the group of the first wind turbine and the at least one second wind turbine;
   switching off the at least one secondary wind turbine on the basis of a measurement of the primary wind turbine; and
   switching on the at least one secondary wind turbine on the basis of a measurement of the primary wind turbine.

2. The method for monitoring a wind farm according to claim 1, wherein, for determining the primary wind turbine, the primary wind turbine exhibits a bigger increase of the determined first or second ice mass or a bigger determined first or second ice mass than the at least one secondary wind turbine.

3. The method for monitoring a wind farm according to claim 1, wherein a first ice alarm is triggered at the primary wind turbine.

4. The method for monitoring a wind farm according to claim 3, wherein the first ice alarm of the primary wind turbine causes a signal for the at least one secondary wind turbine to be switched off.

5. The method for monitoring a wind farm according to claim 4, wherein a second ice alarm is triggered which causes the turbine to be switched off where the second ice alarm is being triggered.

6. The method for monitoring a wind farm according to claim 1, wherein the ice mass of the primary wind turbine is measured over the entire duration of icing on the primary wind turbine.

7. The method for monitoring a wind farm according to claim 1, wherein the switching on of the at least one secondary wind turbine is performed as soon as an ice mass of the primary wind turbine reaches a plateau or an increase of the ice mass of the primary wind turbine becomes negative.

8. The method for monitoring a wind farm according to claim 7, wherein the method is restarted when a further icing event occurs, wherein the reference turbine of the previous icing event is included if the reference turbine is regenerated.

9. The method for monitoring a wind farm according to claim 1, wherein at least one sensor selected from the group consisting of electrical sensors and fiber-optic sensors are used for measuring the first ice mass and at least the second ice mass.

10. A device for monitoring a wind farm, comprising:
    a controller for controlling wind turbines of the wind farm, the controller being adapted to execute the steps according to the method of claim 1.

* * * * *